(No Model.)
S. WILSON.
ROCKING HORSE MOTOR.
No. 490,465. Patented Jan. 24, 1893.
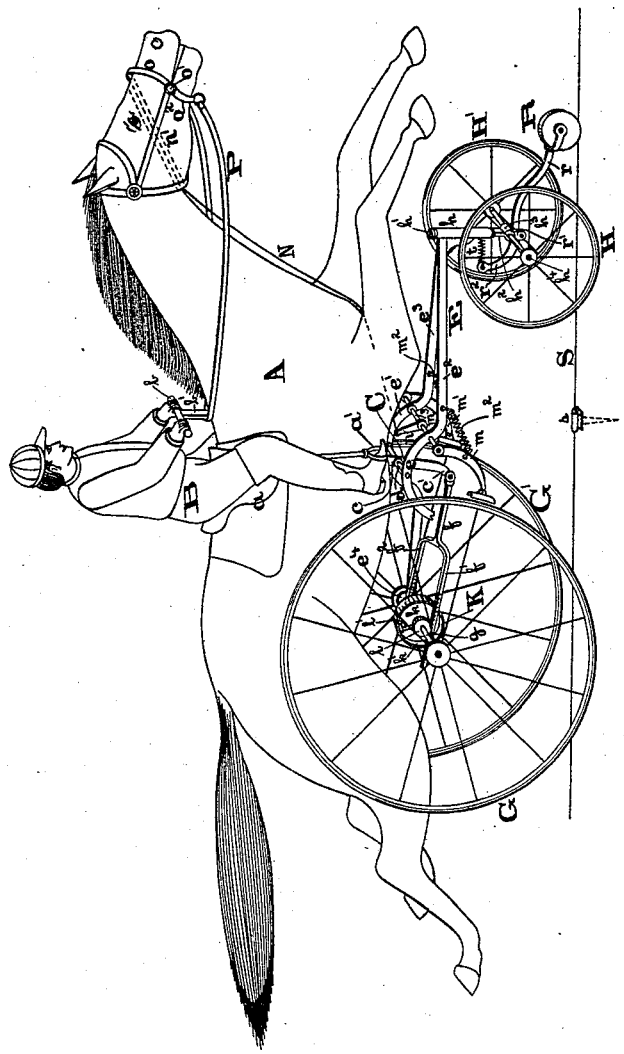
WITNESSES
E. H. Powell
A. M. Jack.
INVENTOR
Stephen Wilson,
By his Attorney,
Wm. de Powell.

UNITED STATES PATENT OFFICE.

STEPHEN WILSON, OF PHILADELPHIA, PENNSYLVANIA.

ROCKING-HORSE MOTOR.

SPECIFICATION forming part of Letters Patent No. 490,465, dated January 24, 1893.

Application filed March 19, 1892. Serial No. 425,644. (No model.)

*To all whom it may concern:*

Be it known that I, STEPHEN WILSON, a citizen of the United States, residing at Philadelphia, in the county of Philadelphia and State of Pennsylvania, have invented certain new and useful Improvements in Rocking-Horse Motors, of which the following is a specification.

My invention has relation to hobby-horses and has for its object the provision of novel and efficient means whereby the rocking of such horses may be utilized as a motive power for their propulsion.

My invention consists of a rocking horse sustained upon a suitable running gear or vehicle, combined with mechanism intermediate said horse and the driving shaft of said gear, whereby the said shaft may be actuated and the vehicle forwardly impelled, upon the necessary movement being imparted to the horse by the rider thereof.

My invention also consists of the provision of means whereby the vehicle above mentioned may be automatically steered or guided in a given course or path and the speed thereof controlled.

My invention further consists in the details of construction and combinations of parts as hereinafter more fully described and claimed and as shown in the accompanying drawing, which drawing represents a perspective view of my invention complete, wherein:

A represents a wooden horse of usual form, provided with the saddle $a$, for the rider B, and stirrups $a'$, only one being shown, for the feet of said rider, said horse being pivotally supported through being mounted on the lever C, the upper portion $c$ of which lever passes into and is secured in the body of the horse. This lever C, as shown, is sustained on the rock-shaft $d$,—the latter being journaled in the offsets $e\ e'$ of the side-bars $e^2\ e^3$ of the frame E,—and has a depending leg or extension $c'$, the same being linked or connected to the arm $f$ of the toothed forks $f'\ f^2$. As will be observed, the rear ends of the side-bars $e^2\ e^3$ diverge laterally and terminate each in an enlargement $e^4$, the latter affording bearings for the axle or driving-shaft $g$ of the driving-wheels G G', while the forward ends of said side-bars converge and terminate in the steering-head $h$, said head having swivelly secured therein, by the nut $h'$, the steering-post $h^2$, said post having secured in the sleeve $h^3$, on its lower end, the axle $h^4$ of the steering-wheels H H'.

The driving-shaft $g$ has secured thereon the driving mechanism, the same being, substantially, of the character shown and described in an application for Letters Patent of the United States, filed by me on July 7, 1891, Serial No. 398,720, and consisting of a cylindrical shell K, having a centrally located diaphragm or partition $k$, dividing said shell into two compartments, but one $k'$ thereof being shown.

Loosely journaled on the shaft $g$ and on each side of the shell K is a gear-wheel, only one appearing, as shown at $l$, the same each having secured to the rear thereof and within the confines of the respective compartments of said shell, a radial arm $l'$, having on their outer ends eccentrically pivoted shoes, as in the application aforesaid.

The forks $f'\ f^2$ are so disposed as that the teeth of the one will mesh with the under side of one of the gears and the teeth of the other with the upper side of the other gear. The effect of this is that as the rider, who braces himself by grasping the handle or rest $b$, by the motion of his body, causes the horse to rock forwardly on its pivotal support, the lower end of the lever C will be actuated rearwardly, causing the fork $f^2$ to actuate its gear in such direction as to cause the arm thereon to move toward the right of the drawing and, consequently, the movement of the shell K the shaft $g$, and the wheels G G' in the same direction, by reason of the engagement of the eccentric shoe with the rim of the shell. At the same time, the gear and arm of the other compartment are moving in the other direction, by reason of the engagement of the fork $f'$ with the top of said gear, the shoe on said arm being so arranged as to slip on the rim in this direction, while engaging with said rim in the other direction of movement. So that when the horse is rocked rearwardly the shoe last mentioned will come into operative relation with the rim of the shell and the forward motion of the driving-shaft and driving-wheels continued. Thus, it will be seen, the motions of the horse in both directions serve to impart a forward motion to said driving-wheels, therefore the motion of the latter is steady, smooth and regular.

As shown in the drawing, the wheels G G' are provided with brakes $m\ m'$, the same having springs $m^2$ secured to them and to the side-bars $e^2\ e^3$ and being secured on the ends of the shaft $m^3$, said shaft being journaled in said bars and having secured thereto the lever $n$, the latter having secured to its outer end the strap N, said strap passing between the forelegs of the horse and through an opening $n'$ in its head, as shown in dotted lines. The outer end of this strap is secured to a curved metallic yoke $o$, the same being pivoted at each side of the mouth of the horse, as shown at $o'$, and having depending legs, only one being shown, as at $o^2$. Secured to rings in the ends of these legs are the ends of the bridle P, the latter resting normally on the standard $b'$, of the handle $b$. Upon draft being exerted on said bridle by the rider, the yoke $o$ will be caused to move forwardly on its pivots and draw the strap N in the same direction, resulting in the application of the brakes to the wheels G G'. This draft being released, the springs $m^2$ will restore said brakes to their original positions. Thus the speed of the vehicle is entirely under the control of the rider.

R is the guide-roller, having a peripheral groove therein for embracing a rail or track of any desired character, although the wire S, for purposes of cheapness, is preferred, such wire being secured in place by retainers driven into or secured to the floor or other place, for example, as shown at $s$. This roller is journaled, at a point in advance of the steering-wheels H H', in the forked ends of a curved arm $r$, said arm being pivoted in lugs on the portion $h^3$ of the steering-post, as shown at $r'$, and having an upwardly curved extension $r^2$, the latter having secured to and intermediate its end and the steering-post a spring $t$. Through the medium of this spring the roller R is maintained in engagement with its rail or track and its pressure on the latter, for purposes of retarding the progress of the vehicle, varied. By locating the guide-roller R in advance of the steering-wheels, the direction of travel of the vehicle is wholly governed by the direction of extent of the rail or track with which said roller is in contact, the steering-wheels being controlled by this roller and the driving-wheels following after said steering-wheels, obviating the necessity for the provision of separate tracks for said steering and driving-wheels.

One way in which this invention may be put into practice is to have a number of parallel ways or tracks, for example, in the form of a race-course, for the guide-rollers of an equal number of vehicles, so that, in addition to the exercise obtained by the riders, a spirit of sport is engendered, naturally, through the endeavors of one rider to excel the speed attained by another.

What I claim as my invention is as follows:

1. In a rocking-horse motor, the combination of a running-gear, a rocking-horse pivotally supported on said gear, a driving-shaft, the shell K secured on the latter, a pair of pinions $l$ having the shoes on their arms $l'$ in alternate engagement with the rim of said shell, and a toothed arm secured to said horse and adapted to engage with the upper edge of one and the lower edge of the other of said pinions, substantially as specified.

2. In a rocking-horse motor, the combination of a running-gear, a rocking-lever supported on said gear, a rocking-horse sustained on the lever, a driving-shaft, the shell K secured on the latter, a pair of pinions $l$ having the shoes on their arms $l'$ in alternate engagement with the rim of said shell, the arm $f$ secured to said lever and having its forks $f'\ f^2$ in engagement with said pinions, substantially as specified.

3. In a rocking-horse motor, the combination of a running-gear, the frame E of the latter, the rock-shaft $d$, the lever C sustained on said shaft, a rocking-horse secured on the lever, a driving-shaft and the shell K thereon, a pair of pinions $l$ having the shoes on their arms $l'$ in alternate engagement with the rim of said shell the arm $f$ secured to the lever C and having its forks $f'\ f^2$ in engagement with said pinions, substantially as specified.

4. In a rocking-horse motor, the combination of a running-gear, a rocking horse supported on and actuating said gear, the driving-wheels provided with suitable brakes, the reins or bridle, and connections intermediate the latter and said brakes, substantially as specified.

5. In a rocking-horse motor, the combination of a running-gear, a rocking-horse supported on and actuating said gear, the driving-wheels provided with suitable brakes, the yoke $o$ pivoted on the head of said horse, the reins or bridle secured to said yoke, and a connection intermediate the latter and said brakes, substantially as specified.

6. In a rocking-horse motor, the combination of a running-gear, the frame E of the latter, a rocking-horse supported on said frame and actuating the driving-wheels, the shaft $m^3$ having thereon the brake-levers $m\ m'$ for said wheels, springs $m^2$ between said levers and frame, the arm $n$, the strap N, the yoke $o$, and the reins or bridle secured to said yoke, substantially as specified.

7. In a rocking-horse motor, the combination of a running-gear, a rocking-horse supported on and actuating said gear, the steering-wheels, a track or way, and a guide for said wheels engaging with said track or way at a point in advance of the axle of the wheels, substantially as specified.

8. In a rocking-horse motor, the combination of a running-gear, a rocking-horse supported on and actuating said gear, the steering-wheels, a track or way, and a grooved roller projecting forwardly of the axle of said wheels and engaging with the track or way, substantially as specified.

9. In a rocking-horse motor, the combination of a running-gear, a rocking-horse supported on and actuating said gear, the steering-wheels, a track or way, a forwardly projecting arm secured to the axle of said wheels, and a grooved roller journaled in the outer end of said arm and engaging with the track or way, substantially as specified.

10. In a rocking-horse motor, the combination of a running-gear, a rocking-horse supported on and actuating said gear, the steering-wheels, the axle $h^4$, the arm $r$ pivotally supported on the latter, the spring $t$ intermediate the end $r^2$ of said arm and the head $h$, the roller R in the outer end of the arm, and a track or way for reception of said roller, substantially as specified.

11. In a rocking-horse motor, the combination of a running-gear, the frame E of the latter, a rocking-horse supported on said frame and actuating said gear, the steering-wheels, the axle $h^4$, the head $h$, the arm $r$ pivoted in the lugs $r'$ on said head, the spring $t$ intermediate the latter and the end $r^2$ of said arm, the roller R in the forked end of the arm $r$, and a track or way for reception of said roller, substantially as specified.

In testimony whereof I have hereunto set my hand this 16th day of March, A. D. 1892.

STEPHEN WILSON.

Witnesses:
WM. H. LOWELL,
R. DALE SPARHAWK.